United States Patent

[11] 3,602,130

| [72] | Inventor | Jesse J. Perez<br>Kansas City, Kans. |
|---|---|---|
| [21] | Appl. No. | 30,893 |
| [22] | Filed | Apr. 22, 1970 |
| [45] | Patented | Aug. 31, 1971 |
| [73] | Assignee | Frank L. Herrera, d.b.a. Casa Herrera<br>Los Angeles, Calif. |

[54] CONTINUOUS TACO MOLDING AND FRYING MACHINE
6 Claims, 4 Drawing Figs.

[52] U.S. Cl. .................................................. 99/404
[51] Int. Cl. .................................................. A47j 27/00
[50] Field of Search .......................................... 99/404,
403, 405, 406, 407, 426–427, 443 C; 107/1 A, 1 E

[56] References Cited
UNITED STATES PATENTS

| 2,773,442 | 12/1956 | Contreras | 99/404 |
| 2,967,474 | 1/1961 | Ford | 99/404 |
| 3,267,836 | 8/1966 | Yepis | 99/404 |

*Primary Examiner*—Robert W. Jenkins
*Assistant Examiner*—Arthur O. Henderson
*Attorney*—Fishburn, Gold and Litman ABSTRACT: Taco dough holders secured in spaced relation along a pair of continuously moving adjacent endless chains are each composed of a central dough-receiving inverted V portion with outer edges. Side wings are hingedly connected at these edges and are adapted to cooperate with guide rods positioned along the path of the chains for selectively rotating the wings to an open position for receiving the taco dough or discharging taco shells. Springs selectively urge the wings to a closed position for retaining the dough in folded condition during cooking.

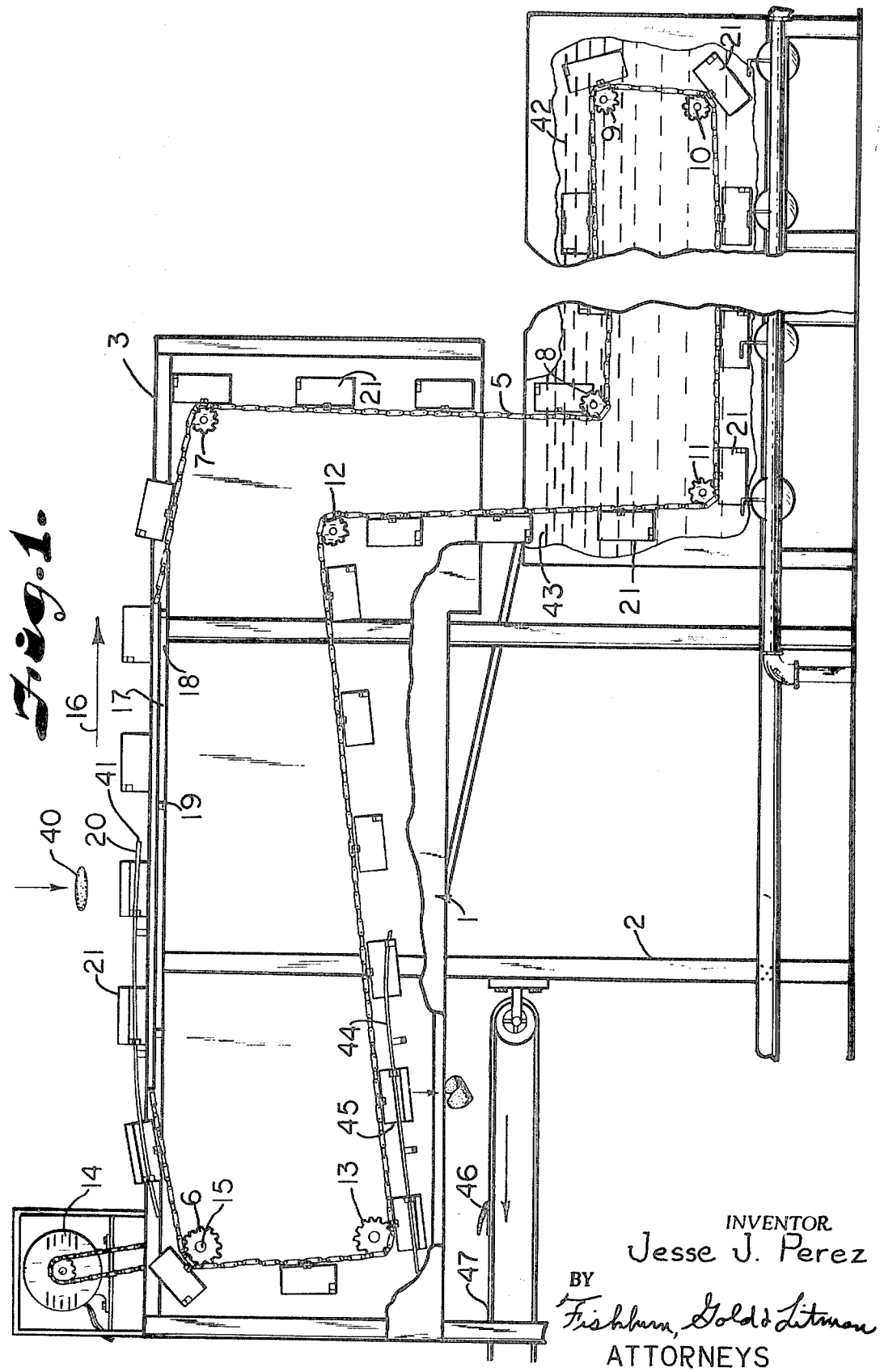

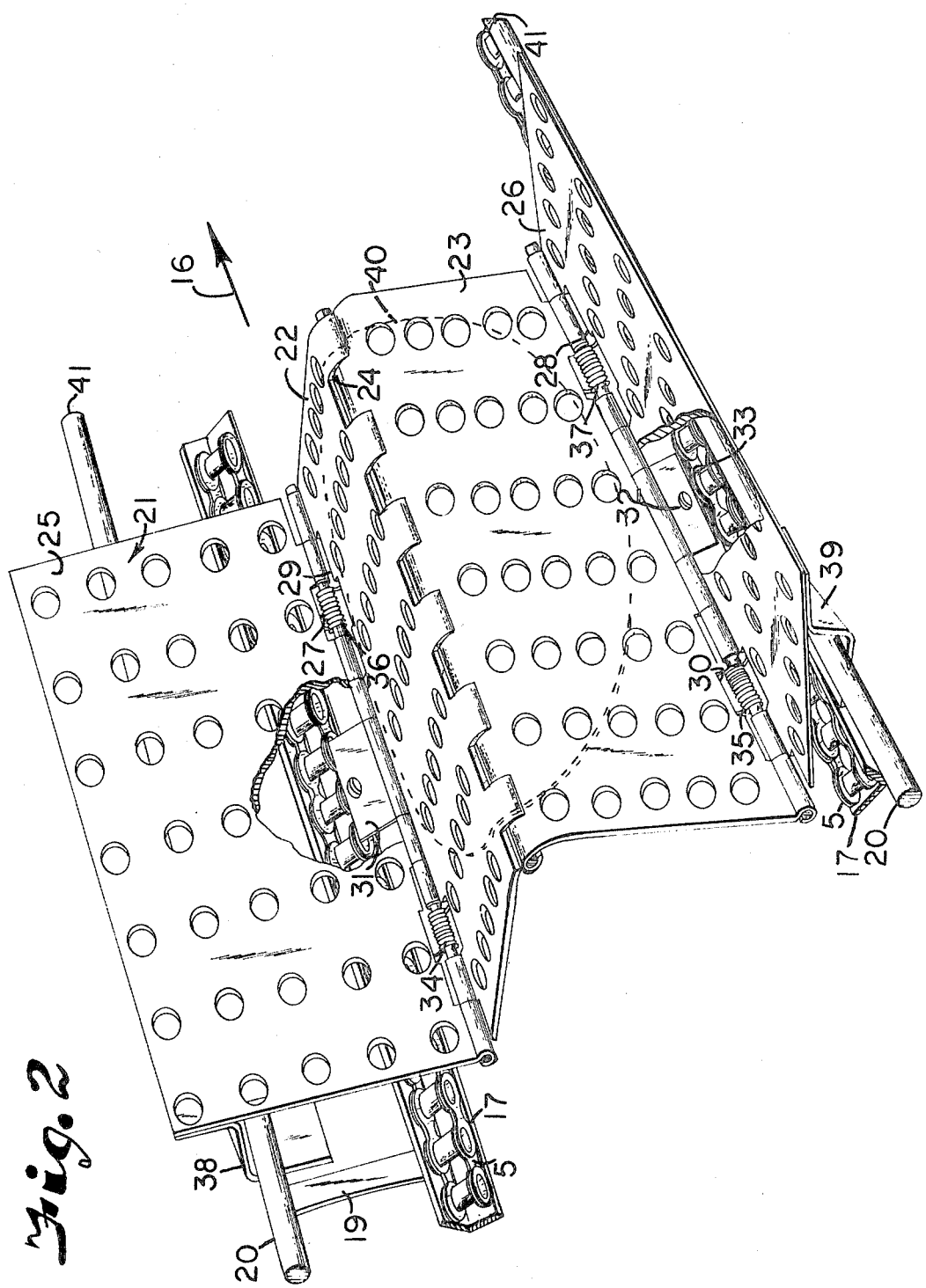

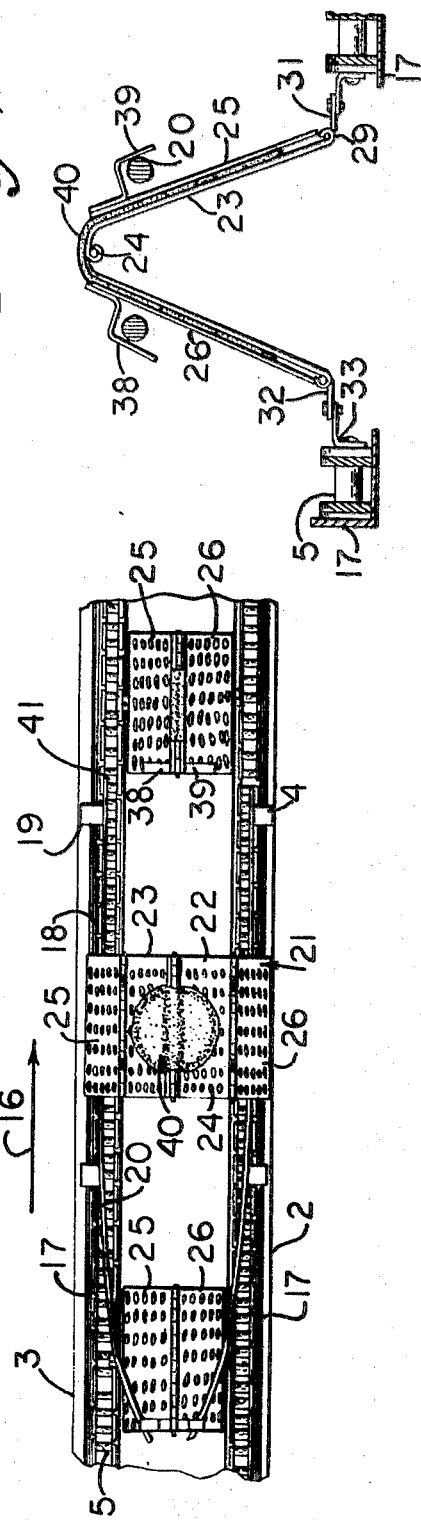

CONTINUOUS TACO MOLDING AND FRYING MACHINE

This invention relates to cooking apparatus and more particularly such apparatus which automatically folds taco dough or tortillas into a desired configuration, and cooks the dough while maintaining this configuration and then discharges the cooked taco shell.

The apparatus employs a tank or vessel containing cooking oil, a suitable heater associated therewith for maintaining cooking temperature. Individual cakes of taco dough are placed on respective open holders or molds continuously moving on a pair of endless chains, the holders automatically closing to retain the dough thereon while the holders are moved through the hot cooking oil. Following cooking, the holders open upside down, whereupon the cooked dough is discharged as formed taco shells.

The holders or molds each include a central inverted "V" portion made of perforated plates. Hinged longitudinally along outer edges of the plates and adapted to cooperate with stationary guide rods are sideplates or wings which pivot between an open position for receiving taco dough and discharging cooked shells, and a closed position for retaining the dough in folded position for frying in the cooking oil. In the embodiment described below, the molds or holders move through spaced horizontal flights during receipt of the dough and discharge of the cooked taco shell, and further horizontal flights at a different level for immersion into the cooking oil.

Prior art taco shell molding and frying machines are known, however, compared to the apparatus described herein, they are generally expensive, highly complicated, cumbersome and unreliable in operation or tend to damage the taco dough or shell.

The principal objects of the present invention are: to provide an automatic taco molding and frying machine which is simple in construction, rapid and reliable in operation, does not damage the taco dough or cooked shell during handling and is well suited for its intended purpose.

Other objects and advantages of this invention will become apparent from the following description taken in connection with the accompanying drawings wherein are set forth by way of illustration and example certain embodiments of this invention.

FIG. 1 is a side elevation of a taco molding and frying machine embodying this invention.

FIG. 2 is a fragmentary perspective view, on a greatly enlarged scale over that of FIG. 1, showing an individual taco shell or mold in upright, open, dough receiving position.

FIG. 3 is an end elevation showing an individual taco shell holder or mold with the side wings closed and retaining a taco shell in desired configuration for cooking.

FIG. 4 is a fragmentary plan view showing the taco dough receiving portion of the machine.

Referring to the drawings in more detail:

The reference numeral 1 generally indicates a taco molding and frying machine embodying this invention. The machine 1 comprises a frame 2 supporting a receiving and discharge section 3 and a cooking section 4. A pair of endless chains 5 are mounted in spaced-apart parallel relation on suitable sets of sprockets 6–13 located with respect to the frame 2 so that the chain travels continuously in an endless loop between the cooking section 4 and the receiving and discharge section 3, as shown in FIG. 1. A suitable prime mover 14, such as an electric motor, drives a shaft 15 supporting the sprockets 6 whereby the chain is driven in the desired direction, as indicated by the arrow 16.

The chains 5 are respectively movably retained in a pair of facing angles 17 along an upper chain flight 18 in the section 3, the angles 17 being suitably supported on the frame 2. Braces 19 are secured to the angles 17 and support selectively curved guide rods 20 for a purpose discussed below. Taco shell molds or holders 21 are spaced along the chains 5 and comprise center plates 22 and 23 hinged together along a common inner side edge 24. Sideplates or wings 25 and 26 have inner side edges 27 and 28 respectively hinged to outer side edges 29 and 30 of the respective central plates 22 and 23.

Lugs 31 and 32 are pivotally mounted on the respective hinge connections between the side wings or plates 25 and 26 and center plates 22 and 23 and project laterally therefrom. The respective chains 5 are slidably supported in the angles 17 and connect to the respective lugs 31 and 32 by means of a suitable connector or bracket 33. Thus, the movement of the chains 5 along the angles 17 causes the taco mold or holder 21 to move longitudinally of the frame 2 in the direction indicated by the arrow 16.

The sideplates or wings 25 and 26 are respectively urged inwardly toward the center plates 22 and 23 by suitable springs 34–37 associated with the hinged connection between the respective central and outer plates. However, as best illustrated in FIG. 2, the sideplates are selectively retained in an open or "W" position by the guide rods 20. The rods 20 cooperate with cam follower brackets 38 and 39 respectively connected to the sideplates 25 and 26. The movement of the holders 21 with the chains 5 causes the sideplates to hinge or pivot away from the center plates 22 and 23 in response to the changing relative positions of the rods 20 for producing various operational positions thereof, as described below.

Thus, adjacent the upper flight 18, the rods 20 are suitably positioned and diverge apart sufficiently to engage the brackets 38 and 39 and pivot the sideplates 25 and 26 open for receiving a disc of taco dough 40 thereon. The dough, being pliable takes the form of an inverted "V" shape following the contour of the surface of the hinged center plates 22 and 23. The rods 20 terminate at 41 whereupon the sideplates 25 and 26 are no longer supported in the open position and the respective springs 34–37 function to close the sideplates 25 and 26 over the taco dough 40, thus securing the dough in position, FIG. 3.

The respective holders 21, after closing on and securing the taco dough, continue to the end of section 3, as indicated in FIG. 1, whereupon they pivot about the sprockets 7 and move vertically downwardly into the cooking oil 42. The holders 21 then pivot to a horizontal flight about the sprockets 8 to the end of the cooking section 4 where they turn with the sprockets 9 and 10 for a return journey along the section 4. The holders 21 then pivot about the sprocket 11 and move vertically out of the cooking oil at 43.

The holders 21, after leaving the cooking oil, pivot about the sprocket 12 so as to assume a horizontal upside down position. The respective holders then engage guide rods 44 which diverge from each other for opening the sideplates or wings 25 and 26 whereupon at the position indicated at 45, the wings are sufficiently pivotally separated from the central plates 22 and 23 so that the cooked taco shell 46 is free to drop vertically therefrom.

In the embodiment shown, an endless moving belt 47, is used to carry the cooked taco shells 46 away from the apparatus 1, for example, for packing, however, a suitable receptacle (not shown) may be placed beneath the position 45 to receive the cooked shells, if desired.

It is to be understood that although certain embodiments of this invention have been illustrated and described, it is not to be limited thereto except insofar as such limitations are included in the following claims.

What I claim and desire to secure by Letters Patent is:

1. Apparatus for converting taco dough into cooked taco shells comprising in combination:

a. a frame having a receiving section and a cooking section, b. a cooking vessel in said cooking section and adapted to contain heated cooking oil, c. driven endless chain means movably supported on said frame and adapted to continuously travel between said receiving section and said cooking vessel, d. a plurality of taco dough holders mounted on said chain means in spaced-apart relation, said holders respectively comprising central plate portions forming an inverted V with outer edges, e. a pair of sideplates each having an edge hingedly connected to one of said outer edges for selective pivotal folding of said sideplates adjacent said central plate portions and unfolding away from said central plate portions, f. cam follower members secured to said sideplates, guide means mounted on said frame-receiving section and adapted to selectively slidably engage said cam follower members for unfolding said sideplates away from said central plate portions, and g. means for selectively folding said sideplates adjacent said central plate portions to secure taco dough in said holders during said passage to said cooking vessel.

2. The apparatus as set forth in claim 1 wherein:

a. said means for folding said sideplates adjacent said central plate portions includes yieldable springs associated with said outer edges.

3. The apparatus as set forth in claim 1 including:

a. a discharge section associated with the path of travel of said chain means from said cooking vessel to said receiving section, b. said discharge section including guide means for unfolding said sideplates during inversion of said holder.

4. The apparatus as set forth in claim 1 wherein:

a. said chain means comprises a pair of spaced-apart chains.

5. The apparatus as set forth in claim 4 including:

a. a pair of elongated members slidably supporting said respective chains thereon during a portion of the engagement between said guide means and said cam follower members.

6. The apparatus as set forth in claim 1 wherein:

a. said guide means are elongated rods.